United States Patent
Zinke et al.

(10) Patent No.: US 8,955,802 B2
(45) Date of Patent: Feb. 17, 2015

(54) LUGGAGE STORAGE COMPARTMENT, AIRCRAFT WITH A LUGGAGE STORAGE COMPARTMENT, AND METHOD FOR OPERATING THE LUGGAGE STORAGE COMPARTMENT

(71) Applicants: Diehl AirCabin GmbH, Laupheim (DE); Diehl Aerospace GmbH, Ueberlingen (DE)

(72) Inventors: Michael Zinke, Postbauer-Heng (DE); Andreas Hanft, Nuremberg (DE); Oleg Graf, Illertissen (DE)

(73) Assignees: Diehl AirCabin GmbH, Laupheim (DE); Diehl Aerospace GmbH, Ueberlingen (DE)

( * ) Notice: Subject to any disclaimer, the term of this patent is extended or adjusted under 35 U.S.C. 154(b) by 149 days.

(21) Appl. No.: 13/827,435

(22) Filed: Mar. 14, 2013

(65) Prior Publication Data

US 2013/0249365 A1    Sep. 26, 2013

(30) Foreign Application Priority Data

Mar. 26, 2012   (DE) .......................... 10 2012 005 917

(51) Int. Cl.
*B64D 47/00*   (2006.01)
*B64D 11/00*   (2006.01)

(52) U.S. Cl.
CPC ................................... *B64D 11/003* (2013.01)
USPC ..................... 244/118.1; 244/118.5; 244/119; 312/319.5

(58) Field of Classification Search
USPC ..................................... 244/118.5, 118.1, 119
See application file for complete search history.

(56) References Cited

U.S. PATENT DOCUMENTS

| | | | | | |
|---|---|---|---|---|---|
| 4,275,942 | A | * | 6/1981 | Steidl | 312/266 |
| 5,383,628 | A | * | 1/1995 | Harriehausen et al. | 244/118.1 |
| 5,456,529 | A | * | 10/1995 | Cheung | 312/245 |
| 5,549,258 | A | * | 8/1996 | Hart et al. | 244/118.1 |
| 5,651,733 | A | * | 7/1997 | Schumacher | 454/76 |
| 5,687,929 | A | * | 11/1997 | Hart et al. | 244/118.1 |
| 5,716,027 | A | * | 2/1998 | Hart et al. | 244/118.1 |
| 5,842,668 | A | * | 12/1998 | Spencer | 244/118.1 |
| 5,938,149 | A | * | 8/1999 | Terwesten | 244/118.5 |
| 6,007,024 | A | * | 12/1999 | Stephan | 244/118.1 |

(Continued)

FOREIGN PATENT DOCUMENTS

| | | |
|---|---|---|
| DE | 199 63 043 A1 | 12/2000 |
| DE | 603 01 219 T2 | 6/2006 |

(Continued)

*Primary Examiner* — Christopher P Ellis
*Assistant Examiner* — Medhat Badawi
(74) *Attorney, Agent, or Firm* — Scully, Scott, Murphy & Presser P.C

(57) ABSTRACT

The present invention is directed to a luggage storage compartment for an aircraft having high ease of operation. Specifically, the luggage storage compartment comprises a housing and a housing container, with a drive device for moving the housing container between an open position O and a closed position C, with a closure apparatus for locking and unlocking the housing container in the closed position C, and with a control device for controlling the drive device, the control device being designed to actuate the drive device so that said drive device in a relief cycle guides the luggage container first into a relief region R and then into the closed position C, the closure apparatus being lockable or unlockable in a relieved state in the relief cycle.

14 Claims, 3 Drawing Sheets

(56) References Cited

U.S. PATENT DOCUMENTS

| | | | |
|---|---|---|---|
| 6,045,204 A * | 4/2000 | Frazier et al. | 312/247 |
| 6,484,969 B2 * | 11/2002 | Sprenger et al. | 244/118.5 |
| 6,802,476 B2 * | 10/2004 | Collet et al. | 244/100 R |
| 7,090,314 B2 * | 8/2006 | Burrows et al. | 312/246 |
| 7,128,295 B2 * | 10/2006 | Scown | 244/118.1 |
| 7,258,406 B2 * | 8/2007 | Stephan et al. | 312/246 |
| 7,922,119 B2 * | 4/2011 | Muin et al. | 244/118.5 |
| 7,937,169 B2 * | 5/2011 | Kneller et al. | 700/83 |
| 8,028,957 B2 * | 10/2011 | Wolf et al. | 244/118.5 |
| 8,262,022 B2 * | 9/2012 | Young et al. | 244/118.5 |
| 8,480,029 B2 * | 7/2013 | Young et al. | 244/118.5 |
| 8,783,609 B2 * | 7/2014 | Schneider et al. | 244/118.5 |
| 2001/0011692 A1 * | 8/2001 | Sprenger et al. | 244/118.5 |
| 2006/0049310 A1 * | 3/2006 | Park et al. | 244/118.5 |
| 2006/0091257 A1 * | 5/2006 | Melberg et al. | 244/118.5 |
| 2006/0214055 A1 * | 9/2006 | Novak et al. | 244/118.5 |
| 2008/0073462 A1 * | 3/2008 | Wolf et al. | 244/118.1 |
| 2010/0206985 A1 * | 8/2010 | Rahlff | 244/118.5 |
| 2010/0288879 A1 * | 11/2010 | Bock et al. | 244/118.5 |
| 2011/0133029 A1 * | 6/2011 | Berkenhoff et al. | 244/118.5 |
| 2011/0139929 A1 * | 6/2011 | Young et al. | 244/118.5 |
| 2012/0038253 A1 * | 2/2012 | Rafler et al. | 312/237 |
| 2012/0273613 A1 * | 11/2012 | Ulbrich-Gasparevic et al. | 244/118.1 |
| 2012/0273615 A1 * | 11/2012 | Rafler | 244/118.5 |
| 2012/0292445 A9 * | 11/2012 | Rahlff | 244/118.5 |
| 2012/0318917 A1 * | 12/2012 | Schneider et al. | 244/118.5 |
| 2012/0325963 A1 * | 12/2012 | Young et al. | 244/118.5 |
| 2013/0233971 A1 * | 9/2013 | Burrows | 244/118.5 |
| 2013/0249365 A1 * | 9/2013 | Zinke et al. | 312/319.5 |

FOREIGN PATENT DOCUMENTS

| | | |
|---|---|---|
| DE | 10 2009 057 014 A1 | 6/2011 |
| WO | WO 95/18040 A1 | 7/1995 |

* cited by examiner

LUGGAGE STORAGE COMPARTMENT, AIRCRAFT WITH A LUGGAGE STORAGE COMPARTMENT, AND METHOD FOR OPERATING THE LUGGAGE STORAGE COMPARTMENT

BACKGROUND OF THE INVENTION

The invention relates to a luggage storage compartment with a housing and with a housing container, the housing container being arranged movably in the housing, with a drive device for moving the housing container between an open position and a closed position, with a closure apparatus for locking and unlocking the housing container in the closed position, and with a control device, which is designed to actuate the drive device so that said drive device in a closing cycle moves the housing container in a first direction of movement from the open position into the closed position and in an opening cycle moves the housing container in a second direction of movement from the closed position into the open position. The invention also relates to an aircraft with a luggage storage compartment of this type, and to a method for operating the luggage storage compartment.

DISCUSSION OF THE PRIOR ART

In passenger aircraft, luggage compartments are normally arranged above the rows of seats for the passengers in order to receive luggage belonging to the passengers. The luggage has to be secured in the luggage compartments, said luggage compartments therefore normally being closable. In a known embodiment, the luggage compartments have closable panels, which are opened in order to fill the luggage compartments and are then closed to secure the luggage. In another known embodiment, the luggage compartments have pivotable lockers, which can be pivoted down to receive articles of luggage and can be pivoted closed in order to secure the articles of luggage. The compartments can be pivoted out manually or in an automated manner.

For example, document DE 10 2009 057 014 A1, which is the closest prior art, discloses an apparatus for closing a lowerable locker of a luggage compartment. The apparatus comprises a drive system, which is designed to lower the locker for loading and to then raise the locker in order to secure the luggage. The locker is locked in the closed position thereof.

SUMMARY OF THE INVENTION

The object of the invention is to propose a luggage storage compartment for an aircraft, said luggage storage compartment having high ease of operation. This object is achieved by a luggage storage compartment having the features in Claim 1, an aircraft having the features in Claim 12, and by a method having the features in Claim 13. Preferred or advantageous embodiments of the invention will emerge from the dependent claims, the following description, and the accompanying figures.

A luggage storage compartment is proposed that is suitable and/or designed for an aircraft, in particular a passenger aircraft. The luggage storage compartment is preferably integratable in an aircraft cabin, and it is designed in particular to be installed in an overhead area above the passenger rows. The luggage storage compartment is preferably designed as a component or as a segment of what is known as a hatrack, or forms the hatrack.

The luggage storage compartment comprises a housing, which preferably has mechanical interfaces for fastening the luggage storage compartment in the aircraft cabin.

The luggage storage compartment further comprises a luggage container for receiving luggage. The luggage container is preferably designed as a locker, more specifically in the form of what is known as a pivot bin. In this function, the luggage container has a receiving opening, by means of which it can be loaded with luggage, in particular hand luggage. The luggage container is particularly preferably mounted pivotably in the housing about a pivot axis. In alternative embodiments the luggage container may also carry out an overlapping pivot/linear motion or a purely linear motion during an opening or closing process.

The luggage storage compartment has a drive device, which is designed to move, in particular pivot, the housing container between an open position and a closed position. In the open position, the receiving opening of the luggage container is preferably released for loading with the luggage. In the closed position, the luggage storage compartment is closed. The receiving opening is preferably inaccessible in the closed position. The drive device is preferably operated by an external power supply, in particular via an electric motor.

The luggage storage compartment has a closure apparatus, which is designed to lock and unlock the housing container in the closed position. This locking is sensible since a drive device designed for normal operation cannot reliably withstand very high forces, which are effective for example in the event of an emergency landing of the aircraft. The closure apparatus in particular is designed independently of the drive device. The closure apparatus may be designed as a locking apparatus, latching apparatus or snap-in apparatus. In particular, the housing container is locked with an interlocking fit by the closure apparatus. In a locked state of the closure apparatus, the housing container is blocked against transfer into the open position. In the unlocked state of the apparatus, the housing container can be transferred into the open position. In particular, the closure apparatus is weighted in the locked state by the housing container when said housing container is located in the closed position or as soon as it is located in said position. In particular, "weighted" means that the housing container introduces a load moment into the closure device by means of its own weight and possibly by means of an additional weight provided by articles of luggage or the like.

The luggage storage compartment further comprises a control device for actuating the drive device so that said drive device in a closing cycle moves or pivots the housing container in a first direction of movement, in particular a direction of pivot from the open position into the closed position, and in an opening cycle moves or pivots the housing container in a second direction of movement, in particular a direction of pivot from the closed position into the open position. In particular, first and second directions of movement or directions of pivot are oriented in opposite directions.

Within the scope of the invention, it is proposed for the control device to be designed to actuate the drive device in such a way that said drive device in a relief cycle guides the luggage container in particular from the closed position first into a relief region and then into the closed position, the closure apparatus being locked or unlocked in a relieved state in the relief cycle. In particular, the speed of movement of the luggage container as it is guided in the relief cycle is controlled, in particular limited, by the drive device.

The invention is based on the consideration that, should the drive device be turned off suddenly directly after the locking process of the closure apparatus, the luggage container would fall into the closure apparatus. This would lead to an impact load of the closure apparatus, which is also perceptible acoustically. Even with a conventional unlocking of the luggage container, the luggage container initially falls in an unbraked manner in the opening direction until either the effect of a damper, which may or may not be provided, takes hold or the drive device is accordingly biased and brakes the luggage container. An impact load is also generated hereby and may lead to a loud opening noise. In addition, the luggage container may initially fall toward the passengers in an unbraked manner immediately after the unlocking of the closure apparatus.

In order to avoid this, the invention proposes to carry out a relief cycle during an opening process or during a closing process or during both of said processes, wherein the luggage container is moved, in particular pivoted, first into a relief region and the closure apparatus is thus relieved. In this state, the closure apparatus can be, and is, locked or unlocked depending on the type of process. Once the luggage container has been drawn into the relief region by the drive device, the unlocking or locking process is carried out without load by the luggage container and thus does not lead to an impact load. The luggage container is then guided into the closed position, wherein the luggage container passes through the closed position in the event of an opening process and is deposited on or at the closure apparatus in a controlled and impact-free manner in the event of a closing process.

The luggage container is thus locked or unlocked in a gentle manner as a result of the addition of further sequences, and the ease of operation of the luggage storage compartment is increased.

It is possible for the closure apparatus to be biased and to snap in place automatically or in a mechanically controlled manner during the closing process. The control device is particularly preferably designed to actuate the unlocking or locking of the closure apparatus during the relief cycle. The control device may also be formed as a number of control modules communicating with one another. The control device therefore controls the drive device and also controls the closure apparatus. The operation may be implemented for example at a local user interface (open/close button) or at a central operator unit (flight attendant panel). The invention can therefore be implemented with simple control.

In particular, the direction of movement, in particular the direction of pivot, of the luggage container is reversed in the relief cycle. More specifically, the luggage container passes through an overstroke, wherein both the speed of movement of the luggage container in the first direction of movement and in the second direction of movement is controlled however by the control device or the drive device. In particular in the event of a movement in the second direction of movement, the speed of movement, in particular the speed of pivot, is slower than in the event of an unbraked movement.

In a possible specific embodiment of the invention, the control device is designed, in the event of the closing process of the luggage container in the closing cycle, to move the housing container in the first direction of movement until said housing container has reached the closed position. In the relief cycle, the luggage container is moved further in the first direction of movement in order to reach the relief region. The luggage container is then moved in the second direction of movement from the relief region into the closed position or is released so as to deposit the luggage container in, at or on the locked closure apparatus. In particular, the luggage container is braked during the movement in the second direction of movement so that it is deposited in a braked manner or gently in the locked closure apparatus in order to avoid an impact load.

In the event of an opening process, the luggage container is preferably moved in the relief cycle in the first direction of movement from the closed position, starting from the locked closure apparatus, until it has reached the relief region to unlock the closure apparatus in the relieved state and to then move the luggage container via the closed position in the opening cycle in the second direction of movement in order to reach the open position. The transfer from the closed position into the relief region is preferably carried out gently in order to avoid impact loads of the luggage container.

In a possible embodiment of the invention, the control device is designed to use a path of displacement, a pivot angle or a variable proportional thereto, such as a number of motor revolutions, a number of revolutions of a gear part in the drive device and the like, as a reference variable for controlling the drive arrangement. In this case, a displacement-dependant control is used in order to guide the luggage container in a controlled manner in the opening cycle, closing cycle and relief cycle. In a possible constructional embodiment, the reference variable is established by a sensor device, such as a displacement measurement system, a pivot angle sensor or another displacement sensor.

In an alternative embodiment of the invention, the control device is designed to actuate the drive arrangement in a time-based manner. A time-dependant control of this type is designed to move the luggage container in the first direction of movement for a specific period of time and to move the luggage container in the second direction of movement for a specific, other period of time.

In accordance with a further possibility for implementing the invention, the control device is designed to actuate the drive arrangement on the basis of a force, in particular a driving force of the drive arrangement. For example, the luggage storage compartment may have an end stop for delimiting the path of displacement, in particular the pivot angle, in the relief region. During operation, a force may be taken up that is required to move the luggage container. As soon as the profile of the taken-up force shows a local maximum or a predefined value, it is assumed that the luggage container has been moved against the end stop so that the direction of movement of the luggage container can then be reversed. The end stop is particularly preferably yielding in order to avoid an impact load of the luggage container. Other possibilities for detecting the position of the luggage container can be implemented by end stop sensors.

It is possible for the control device to be self-learning or self-optimising, wherein measurement data with regard to the path of displacement, the pivot angle, the driving force, the bearing force on the closure apparatus and/or are recorded by sensor devices during training processes and a sequence control of the control device is established or optimised on the basis of the measurement data.

The invention further relates to an aircraft with the luggage storage compartment, as described before or according to one of the preceding claims.

The invention further relates to a method for operating the luggage storage compartment according to one of the preceding claims or as has been described previously, wherein the luggage container is moved in the relief cycle first into the relief region, the closure apparatus is locked (closing process) or unlocked (opening process) in a relieved state depending on the type of process, and the luggage container is then moved into the closed position.

BRIEF DESCRIPTION OF THE DRAWINGS

Further advantages, features and effects of the invention will emerge from the following description of a preferred exemplary embodiment of the invention and from the accompanying figures, in which.

DETAILED DESCRIPTION OF THE INVENTION

Figure 1:
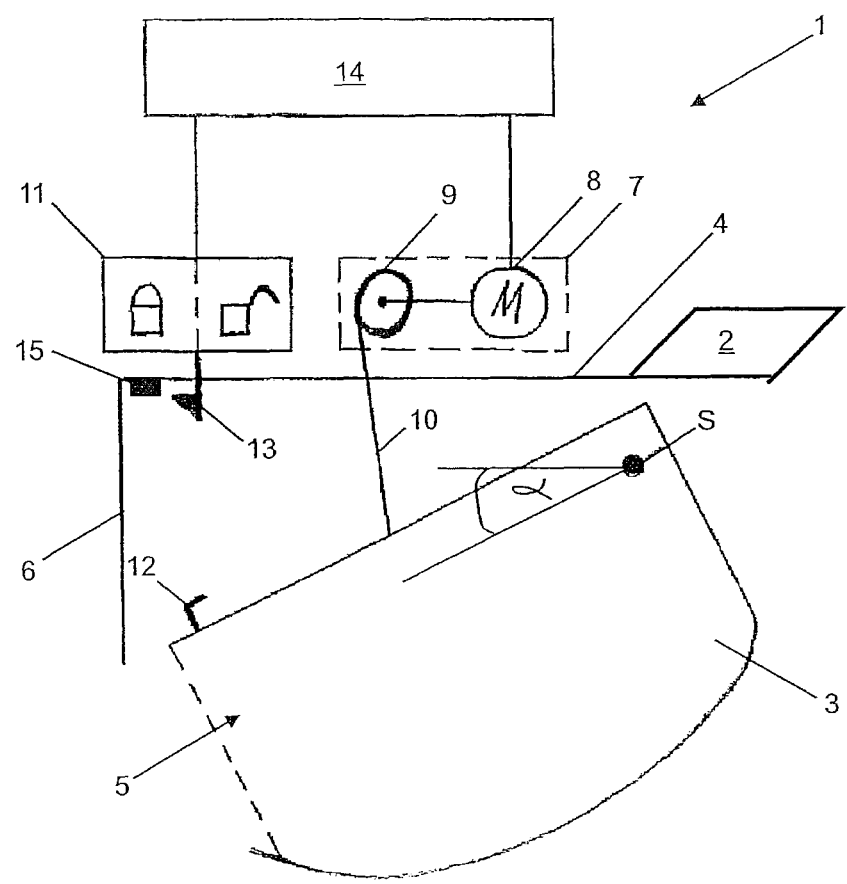
FIG. 1 shows a schematic illustration of a luggage storage compartment as an exemplary embodiment of the invention.

FIG. 1 shows a highly schematic illustration of a luggage storage compartment 1 for an aircraft as an exemplary embodiment of the invention. The luggage storage compartment 1 is arranged in the aircraft and for example is fastened in the form of a hatrack to structural elements 2 of the aircraft above rows of seats for passengers.

The luggage storage compartment 1 comprises a luggage container 3, which is pivotable about a pivot axis S and is arranged pivotably in a housing 4 of the luggage storage compartment 1. The luggage container 3 is formed as a locker or what is known as a pivot bin and has a receiving opening 5, via which the passengers can deposit items of luggage in the luggage container 3. The receiving opening 5 is located on a front side of the luggage container 3.

In FIG. 1, the luggage storage compartment 1 is shown in an opened state, wherein the luggage container 3 is located in an open position (O). By pivoting the luggage container 3 about the pivot axis S through a pivot angle α, the luggage container 3 can be pivoted into the housing 4 and can be transferred into a closed position (C). In the closed position, the receiving opening 5 is closed by a portion 6 of the housing 4 so that the items of luggage in the luggage container 3 are stowed captively.

To implement the pivot movement of the luggage container 3, the luggage storage compartment 1 has a drive device 7, which in this example comprises a motor 8 and a cable arrangement 9 with a cable 10. The cable 10 is fastened to the luggage container 3 and can be drawn in by the motor 8 via the cable arrangement 9 so that the luggage container 3 can be pivoted from the open position into the closed position.

The luggage storage compartment 1 further comprises a closure apparatus 11, which is designed to lock or unlock the luggage container 3 in the closed position as required. Two closure apparatuses 11 of this type are often provided per luggage storage compartment 1. In a possible specific embodiment, the closure apparatus 11 may have a receptacle 12 on the luggage container 3 and a latching hook 13 on the housing 4, wherein the latching hook 13 is introduced into the receptacle 12 for locking and thus locks the luggage container 3 with an interlocking fit in the closed position against a pivot movement into the open position. In specific embodiments, the closure apparatus 11 is formed in a free-running manner with respect to a pivot of the luggage container 3 in the opposite direction. In other embodiments of the invention, the receptacle 12 may also be arranged on the housing side and the latching hook 13 may also be arranged on the luggage container side. The closure apparatus 11 can be controlled electrically so that the luggage container 3 can be locked or unlocked in an automated manner.

To control the drive device 7 and the closure apparatus 11, a control device 14 is provided and is designed for example as a digital data processing device, such as a microcontroller, a DSP, an FPGA or the like. In particular, the control device 14 is designed to actuate the drive device 7 and the closure apparatus 11 in such a way that an opening process and a closing process can be carried out in an automated manner, in particular at the push of a button.

However, not only are the fundamental pivots of the luggage container 4 carried out by the control device 14, but also further movements of the luggage container 4 in order to achieve gentle opening and closing of the luggage container. In particular, the opening process and the closing process are to be carried out without impact load in order to increase the ease of use for the passenger or the flight crew in the aircraft.

Figure 2:
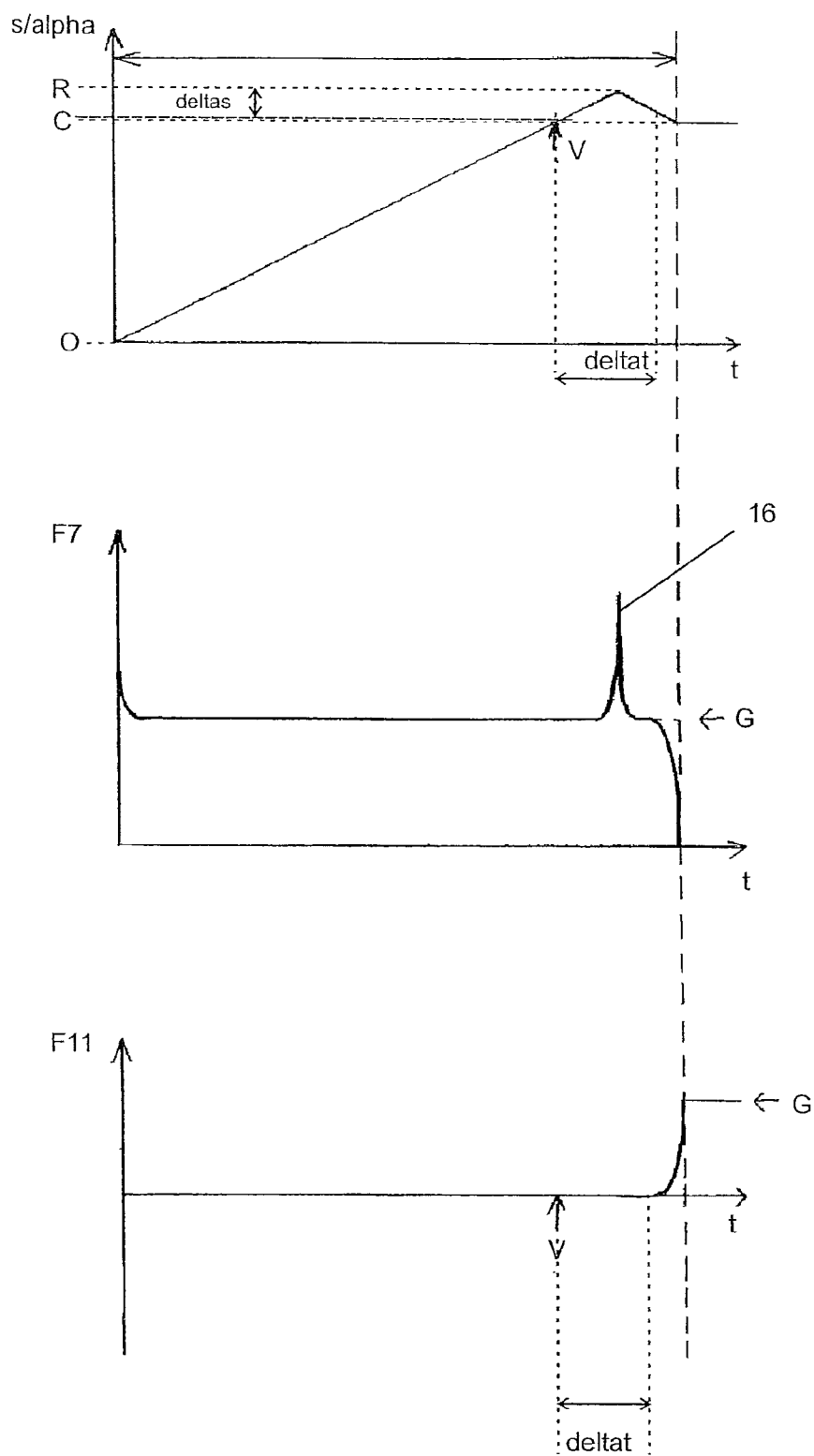
FIG. 2 shows various graphs for illustrating a closing process of a luggage container in the luggage storage compartment in FIG. 1.

Three graphs illustrating the optimized or at least improved closing process of the luggage container are illustrated in FIG. 2, wherein a time t is plotted on the X-axis in each case.

A displacement s or a pivot angle α of the luggage container 3 or of the cable 10 is plotted in the uppermost graph. The driving force F7 that the drive device 7 has to apply is plotted in the middle graph. The force F11 that acts on the closure apparatus 11 is illustrated in the third graph.

As is clear from the first graph, that is to say the displacement/angle over time diagram, the luggage container 3 starts in the open position O in this example with a constant speed and is initially moved in a closing cycle into the closed position C. In principle, the luggage container could be locked in this position by the closure apparatus 11. However, the luggage container 3 is moved further in a relief cycle into a relief region having a maximum R so that the closure apparatus 11 can be locked at a moment in time V without reduction of a load moment from the luggage container 3 onto the closure apparatus 11 (see third graph). If the first graph is considered as a pivot angle/time diagram, the luggage container 3 is thus initially pivoted in a first direction of pivot about the pivot axis S, wherein the luggage container initially passes through the closed position C and is guided into the relief region. The direction of pivot is then reversed and the luggage container 3 is deposited gently and/or in a braked manner at, in particular in or on, the closure apparatus 11. The luggage container 3 can be deposited at the closure apparatus 11 with a linear speed (as shown) or for example by a continuously reducing speed in order to deposit said luggage container in an impact-free manner.

A driving force (F7)/time diagram is shown in the second graph, wherein a starting force initially has to be applied in order to lift the luggage container 3 from the open position O. The driving force to be applied by the drive device 7 is then constant, more specifically amounting to a force of gravity G. Once the luggage container has passed through the closed position C, the driving force may increase (as shown here), but may also be kept constant in the relief region however, as will be explained hereinafter. Once the luggage container 3 has been deposited on the closure apparatus 11, the load moment is transferred from the drive device 7 onto the closure apparatus 11 so that the driving force F7 is reduced.

A force (F11)/time diagram is illustrated in the third graph, wherein the force acting on the closure apparatus 11 is plotted. Compared to the two graphs illustrated above, it can be deduced that a force only acts on the closure apparatus 11 when the luggage container 3 is deposited in a controlled manner on the closure apparatus 11 after passing through the relief region. Due to the braked lowering of the luggage container 3 onto the closure apparatus 11, the force is not introduced into the closure apparatus 11 with an impact, but in a manner increasing linearly to exponentially, wherein the luggage container 3 rests on the closure apparatus 11 with the force of gravity G after the closing process.

Figure 3:
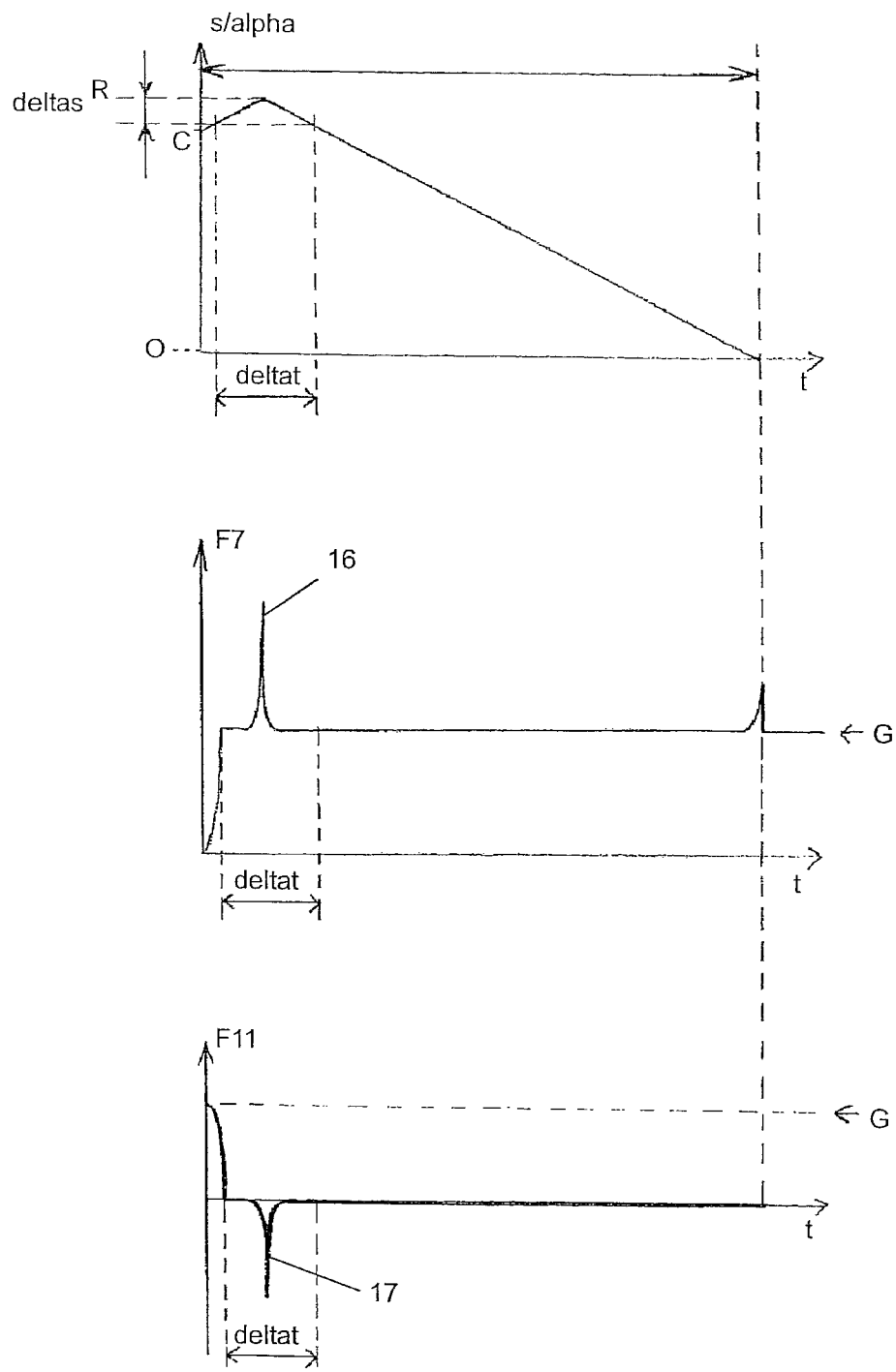
FIG. 3 in a similar illustration to FIG. 2 illustrates an opening process of the luggage container in the luggage storage compartment.

Three graphs similar to those shown in FIG. 2 are again illustrated in FIG. 3, but illustrate the curve profiles with an improved opening process of the luggage container 2. It can be seen from the profiles that the luggage container 3 initially rests on the closure apparatus 11 with the force of gravity G in the closed position C, and therefore a load G of the locking apparatus 11 is plotted in the third graph. In a relief cycle, the luggage container is raised or pivoted into the relief region having the maximum R by applying driving force, as can be inferred from the second graph. In particular, it can be seen from the third graph that the force F7 on the closure apparatus 11 reduces as a result of the transfer from the closed position into the relief region, and said closure apparatus is transferred into a relieved state.

The closure apparatus 11 is relieved or is unlocked in a load-free manner in the period of time deltat or in the displacement range deltas, during which the luggage container 3 is located in the relief region above the closed position C. Following a pivot angle reversal in the maximum R of the relief region, the luggage container 3 passes through the closed position C and is moved in an opening cycle (in this example again at constant speed) into the open position O. Similarly, the closure apparatus can be locked in the period of time deltat or in the displacement range deltas in the event of the closing process in FIG. 2.

The control device 14 can be formed in various ways:

In a first possible embodiment, the control device is formed as a displacement-dependant control unit, which controls the drive device 7 on the basis of a path of displacement of the luggage container 3 or on the basis of an equivalent variable. Possible input variables for control are therefore the pivot angle alpha, the path of displacement s, a number of revolutions of the rotor of the motor 8, etc. In a possible embodiment, the motor 8 is a brushless motor, wherein the motor revolutions can be read out from a driver for the motor 8.

In a second possible embodiment, the control device 14 has time-dependant control, wherein the motor 7 runs through predetermined displacement-time curves, for example stored as a data record.

In a third possible embodiment, the control device is force-dependant, wherein the driving force F7 of the drive device 7 is used as an output variable. In this possible embodiment, the luggage storage compartment 1 has an optional mechanical end stop 15 (FIG. 1), which is contacted when the luggage container 3 moves into the maximum R of the relief region. The end stop may be formed for example as a mechanical delimitation for the luggage container 3. In order to avoid an impact load in this case too, the end stop 15 may be yielding, resilient or deformable. The end stop consists of soft rubber for example.

When the end stop 15 is contacted, a force peak is produced in the curve profile of the driving force F7 and can be detected as an input signal by the control device 14, wherein, in response, the pivot angle reversal is introduced. On the basis of the curve profile of the driving force F7, it is also possible to detect whether the closure apparatus 11 is loaded during the opening process and the luggage container 3 is deposited and the drive device 7 can therefore be deactivated by evaluating the sharp curve fall of the driving force F7 after the relief cycle or at the end of said cycle. Likewise, in the event of the opening process, it is possible on the basis of the rising curve profile of the driving force F7 at the start of the relief cycle to detect whether the closure apparatus 11 is relieved and can be unlocked.

If the end stop 15 is coupled mechanically to the locking apparatus 11, a second, negative peak 17 is produced in the curve profile of the third graph when the end stop 15 is contacted and can be detected additionally or alternatively as an input signal by the control device 14 in order to introduce the pivot angle reversal. This optional embodiment is only indicated in the third graph in FIG. 3.

LIST OF REFERENCE SIGNS 1 luggage storage compartment
2 structural elements
3 luggage container
4 housing
5 receiving opening
6 portion
7 drive device
8 motor
9 cable arrangement
10 cable
11 closure apparatus
12 receptacle
13 latching hook
14 control device
15 end stop
16 force peak
17 negative force peak
G force of gravity
S pivot axis
t time
s displacement

What is claimed is:

1. A luggage storage compartment
with a housing and with a housing container, the housing container being arranged movably in the housing,
with a drive device for moving the housing container between an open position (O) and a closed position (C),
with a closure apparatus for locking and unlocking the housing container in the closed position (C), and
with a control device, which is designed to actuate the drive device so that said drive device in a closing cycle moves the housing container in a first direction of movement from the open position (O) into the closed position (C) and in an opening cycle moves the housing container in a second direction of movement from the closed position (C) into the open position (O),
wherein
the control device is designed to actuate the drive device so that said drive device in a relief cycle guides the luggage container first into a relief region (R) and then into the closed position (C), the closure apparatus being lockable or unlockable in a relieved state in the relief cycle.

2. The luggage storage compartment according to claim 1, wherein that the control device is designed to actuate an unlocking or a locking of the closure apparatus during the relief cycle.

3. The luggage storage compartment according to claim 1, wherein the direction of movement of the luggage container is reversed in the relief cycle.

4. The luggage storage compartment according to claim 1, wherein the control device is designed, in the event of the closing process of the luggage container in the closing cycle, to move the luggage container in the first direction of movement until said luggage container has reached the closed position (C) and in the relief cycle to move the luggage container further in the first direction of movement in order to reach the relief region (R).

5. The luggage storage compartment according to claim 4, wherein the control device is designed, in the event of the closing process, to move the luggage container in a second direction of movement from the relief region (R) into the closed position (C) in order to deposit the luggage container in the locked closure apparatus.

6. The luggage storage compartment according to claim 1, wherein the control device is designed, in the event of an opening process of the luggage container, to move the luggage container in the relief cycle (R) from the closed position (C) in the first direction of movement until it has reached the relief region (R) and in the opening cycle to move the luggage container in the second direction of movement in order to reach the open position (O).

7. The luggage storage compartment according to claim 1, wherein the control device is designed to use a path of displacement (s) or a pivot angle (alpha) as a reference variable or input variable for controlling the drive arrangement.

8. The luggage storage compartment according to claim 1, wherein the control device is designed to actuate the drive arrangement on the basis of a time measurement.

9. The luggage storage compartment according to claim 1, wherein the control device is designed to actuate the drive arrangement on the basis of a measured force, in particular a driving force (F7) of the drive arrangement.

10. The luggage storage compartment according to claim 9, wherein the measured force is a driving force of the drive arrangement.

11. The luggage storage compartment according to claim 9, further comprising an end stop for delimiting a pivot angle (alpha) or the path of displacement (s) of the luggage container in the relief region (R).

12. The luggage storage compartment according to claim 11, wherein the end stop is yielding.

13. An aircraft, comprising a luggage storage compartment according to claim 1.

14. A method for operating a luggage storage compartment according to claim 1, comprising first moving the luggage container in the relief cycle from the closed position (C) into the relief region (R), locking or unlocking the closure apparatus in a relieved state depending on the type of process, and then moving the luggage container into the closed position (C).

* * * * *